H. THIEL.
ESCAPEMENT FOR RUNNING GEARS.
APPLICATION FILED FEB. 27, 1914.

1,106,253.

Patented Aug. 4, 1914.

UNITED STATES PATENT OFFICE.

HEINRICH THIEL, OF RUHLA, GERMANY.

ESCAPEMENT FOR RUNNING-GEARS.

1,106,253.  Specification of Letters Patent.  Patented Aug. 4, 1914.

Application filed February 27, 1914. Serial No. 821,594.

*To all whom it may concern:*

Be it known that I, HEINRICH THIEL, a citizen of the German Empire, residing at Ruhla, Germany, have invented certain new and useful Improvements in Escapements for Running-Gears, of which the following is a specification.

In all escapements long since in use or otherwise well known, the balance or the portion of the escapement directly or indirectly actuated by the balance performs an oscillation, consisting in a back and forth running turning movement. This arrangement of known escapements, particularly when it concerns running gears which themselves partake in a revolution, possesses, however, the considerable disadvantage that the centrifugal force, here generated, has an injurious influence on the balance and consequently on the running of the gear so that considerable irregularities will appear.

The above named disadvantages will now be overcome in the present invention particularly as the balance is given a rectilinear back and forth, instead of the formerly used back and forth turning movement, this rectilinear movement running in the direction of the axis of revolution of the escapement wheel, so that this invention entirely abandons the hitherto customary manner of constructing escapements. For this purpose the balance itself may be constructed in the form of a cylindrical or conical body with an inclined groove or curve, which body is mounted in suitable bearings so that it is able to perform a rectilinear movement in the direction of its own axis, which coincides with the direction of the axis of the escapement wheel, whereby the running-out of the balance body is occasioned by means of the teeth of the said wheel, but the returning movement, by means of an adjustable spring assisted, if necessary by the next following tooth of this wheel. The groove might also be arranged perpendicular to the axis of the movement of the balance, and the teeth of the escapement wheel made correspondingly wider and provided with inclined working surfaces, or any other kind of suitable means might be used to give a rectilinear movement back and forth to the balance.

Figure 1:
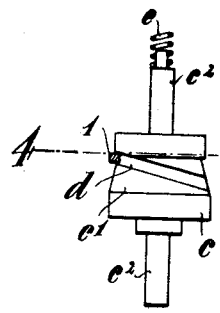
Figure 2:
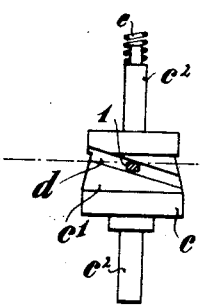
Figure 3:
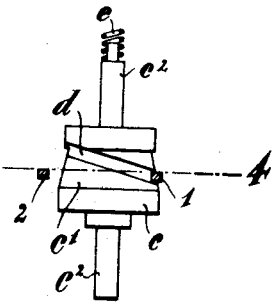
Figure 4:
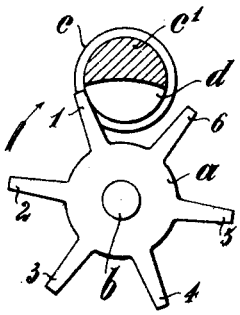
Figure 5:
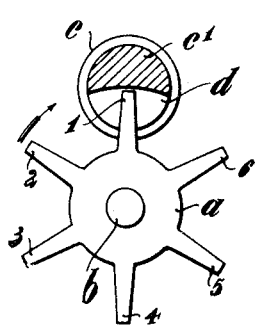
Figure 6:
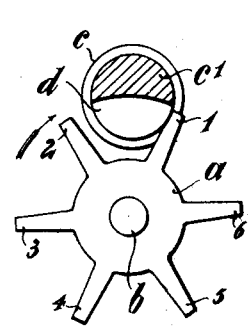

In the accompanying drawing is illustrated one embodiment of the invention in three different positions, and, Figures 1, 2 and 3 represent a side view, and Figs. 4, 5 and 6 are cross sections on line 4—4 of Figs. 1 to 3.

In the shown embodiment $a$ represents the escapement wheel revoluble around the spindle $b$, while $c$ represents the balance body mounted on the spindle $c^2$, which body possesses a portion $c^1$ in the shape of a conic frustum, provided with a groove $d$ running obliquely thereon. The balance body $c$ is actuated by a spring $e$ which abuts against a corresponding shoulder on the spindle $c^2$, and the tension of which may be changed in order to provide adjustment of the running. The spindle $c^2$ of the balance $c$ is carried in spindle bearings, not shown, so that the balance itself is able to move in the direction of the spindle $c^2$. In order to prevent, under all conditions, a turning of the balance body $c$ $c^1$, a pin or similar arrangement may be provided on one part of the balance body $c$ or else on the spindle $c^2$, which pin may slide in a rectilinear groove of a suitable guide or in the bearing for the spindle $c^2$.

The manner of operation of the described escapement will be evident from the figures as follows: Each of the teeth 1, 2, 3, 4, 5, 6 of the escapement wheel $a$ will, during the turning of this wheel $a$ in the direction of the arrow, occasion a lifting of the balance $c$ against the action of the adjustable spring $e$. Fig. 1 in the drawing represents the moment in which tooth 1 of the escapement wheel $a$ enters the groove $d$ of the balance portion $c^1$, thereby starting the lifting of the balance $c$. In Fig. 2 the tooth of the wheel $a$ has advanced into the middle, whereby the balance body $c$ $c^1$ has been moved half the length of the total lifting, while Fig. 3 lastly represents the moment, in which the tooth 1 of the wheel $a$ has left the groove $d$ of the balance portion $c^1$. At this moment the balance has made that stroke which corresponds to the pitch of the groove *d*. It should, however, be kept in mind that the balance does not directly come to rest in the position represented in Fig. 3, but, in consequence of the kinetic energy gained during the lifting, will be thrown upward over the highest point of its lifting caused by escapement wheel, and this upward throwing is greater during the beginning of the running of the running gear than during the releasing of the driving-spring force, which has the advantage that the period in which the up and, subsequent, downward movement of the balance takes place, is equal from beginning to end during the running off of the driving spring. While now in the above described manner the lifting of the balance *c* is caused by the teeth of the wheel *a*, the balance *c* executes its returning movement, that is, in the embodiment represented in the drawing, its downward movement, through the adjustable spring *e*, the action of which is assisted through that tooth of the escapement wheel which follows the tooth previously used for raising the balance. As soon as the tooth 1 of the wheel *a* has run through the groove *d* and left said groove *d*, the next following tooth 2 arrives at the cone shaped side face of the balance portion $c^1$ and tries to displace this portion downward. It is consequently evident that the next following tooth 2 assists the action of the spring *e* in pressing downward the balance; and the escapement wheel must receive a recoiling movement, as long as the balance still continues its upwardly directed movement that is, the escapement operates with recoil action.

From the foregoing, it will be evident that in accordance with the present invention, the balance *c* $c^1$ performs a rectilinear back and forth movement excluding the heretofore usual disadvantageous turning movement, the escapement teeth 1, 2, 3, 4, 5, 6 each causing a lifting, that means the outgoing movement of the balance, while the spring *e*, assisted by the escapement wheel, (recoil action) causes the downwardly directed, that is the returning movement, of the balance.

Instead of using so-called recoil action, the return movement may also take place by means of the adjustable spring *e* alone, in which case the portion $c^1$ of the balance body may be shaped completely cylindrical while the groove *d* naturally remains the same. In either case the action is the same, that means the balance executes, contrary to the heretofore known escapements, a rectilinear, back and forth going, movement in the direction of its axis, that means parallel to the axis of the escapement wheel *a*. Should now the axis in which the rectilinear movement of the balance takes place be arranged parallel to that axis around which the entire running gear is turning it will be obvious that the disturbing influences of the centrifugal force are then completely removed, said influences existing in a running gear which executes a turning movement itself and which is provided with an escapement of the heretofore known kind. The axis along which the rectilinear movement of the balance takes place in accordance with the present invention, may also be laid in the axis of revolution itself of the running gear.

I claim:

1. An escapement for clockworks having a balance and an escapement wheel, said balance having a rectilinear back and forward movement.

2. An escapement for clockworks having a balance and an escapement wheel, said balance having a rectilinear back and forward movement in the direction of the axis of revolution of said escapement wheel.

3. An escapement for clockworks comprising an escapement wheel, a balance having a rectilinear back and forward movement in the direction of the axis of revolution of said escapement wheel and constructed with a groove, and a spring tending to drive said balance in one direction, said escapement wheel having teeth constructed to engage one at a time with said groove, thereby giving movement to said balance against the action of said spring.

4. An escapement for clockworks comprising an escapement wheel, a balance having a rectilinear back and forward movement in the direction of the axis of revolution of said escapement wheel and constructed with an obliquely running groove and a spring tending to drive said balance in one direction, said escapement wheel having teeth constructed to engage one at a time with said groove, thereby giving movement to said balance against the action of said spring.

5. An escapement for clockworks comprising an escapement wheel, a balance having a rectilinear back and forward movement in the direction of the axis of revolution of said escapement wheel and constructed with a groove, and a spring tending to drive said balance in one direction, said escapement wheel having teeth constructed to engage one at a time with said groove, thereby giving movement to said balance against the action of said spring, the tooth of said escapement wheel next in order to the tooth having passed said groove being adapted to assist the backward movement of said balance in coöperation with said spring.

6. In a clockwork executing a revolution as a whole, an escapement having a balance, said balance having a rectilinear back and forward movement, the axis along which said rectilinear movement of the balance takes place lying parallel to the axis of revolution of the clockwork.

In testimony whereof the foregoing specification is signed in the presence of two witnesses.

HEINRICH THIEL.

Witnesses:
HULDA SCHRÖDER,
GRAHAM H. KEMPER.